Patented Feb. 18, 1936

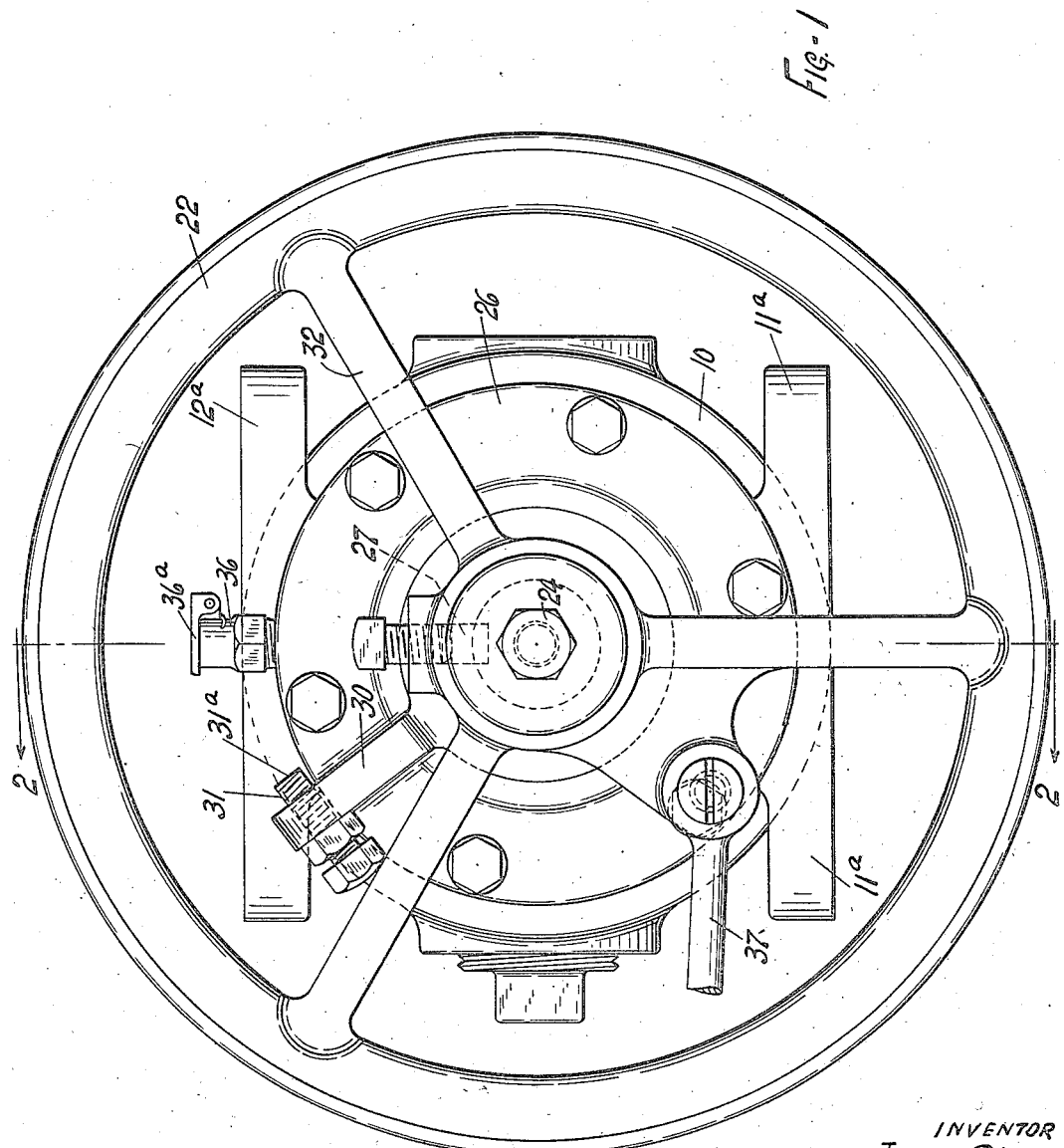

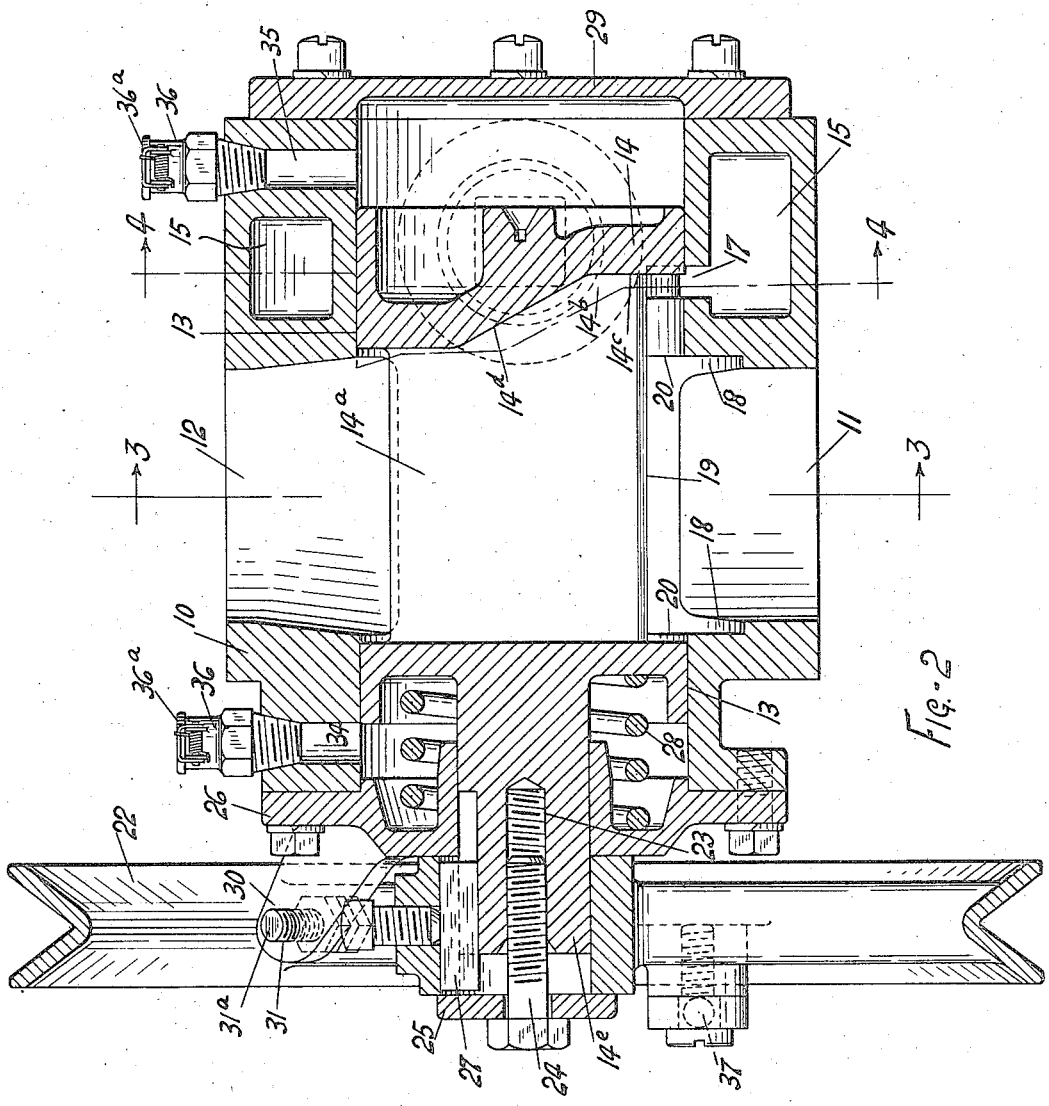

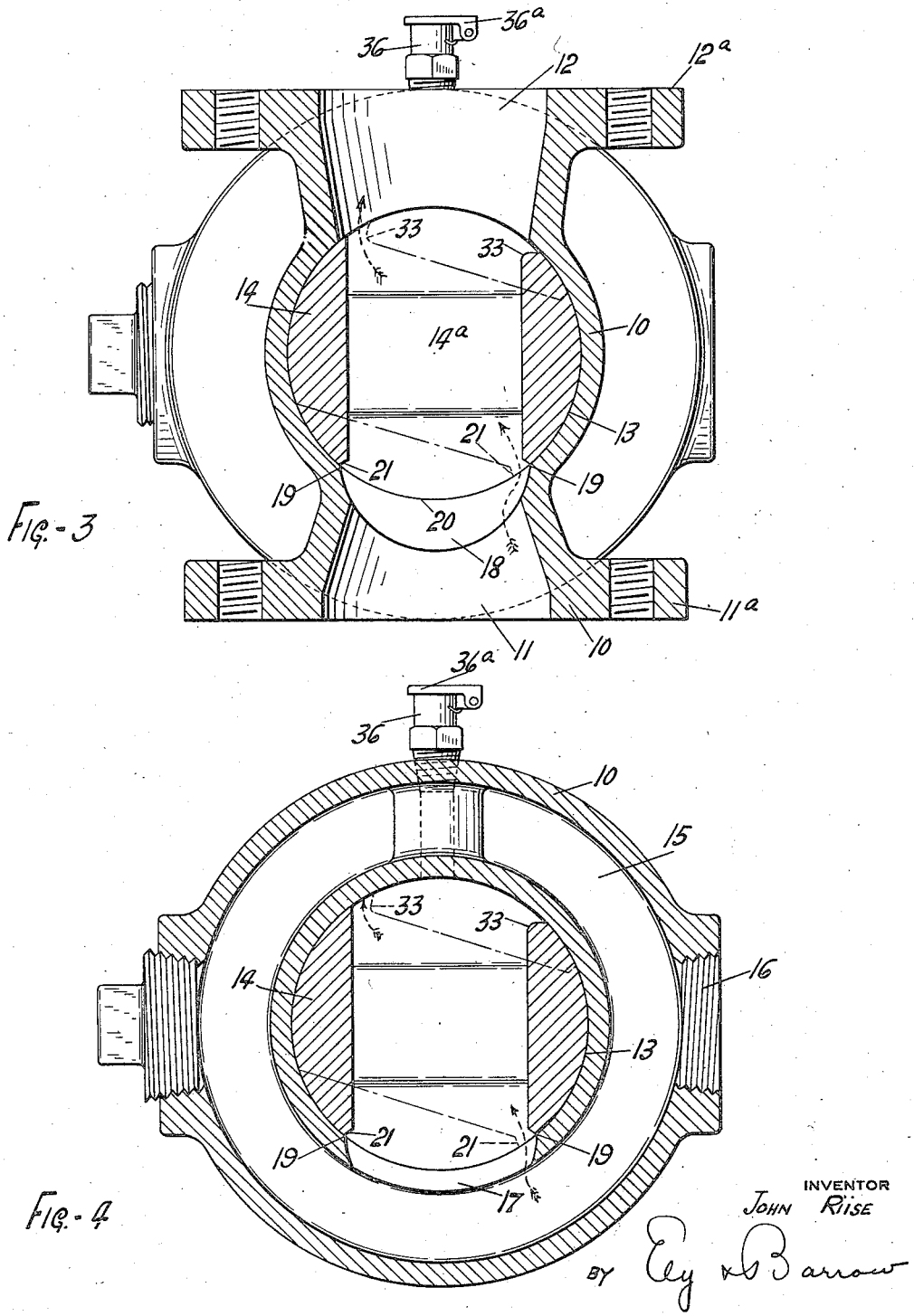

2,031,332

UNITED STATES PATENT OFFICE 2,031,332

GASEOUS FUEL MIXING VALVE

John Riise, Doylestown, Ohio

Application May 7, 1931, Serial No. 535,635

9 Claims. (Cl. 48—180)

This invention relates to gaseous fuel mixing valves adapted for use with internal combustion engines.

Heretofore, a number of different types of gas mixing valves have been employed for use with internal combustion engines using gases such as natural gas for fuel. So far as is known, these have not been entirely satisfactory for the reason that the same proportions of air and gas are not maintained at all engine speeds.

The general purpose of the present invention is to provide a gaseous fuel mixing valve for this purpose which will mix air and gas in the same proportions at any speed from a low idling speed to maximum speed with highly effective acceleration and with a delivery of power commensurate with the amount of fuel used. Another purpose of the invention is to provide a valve of this type capable of a simple adjustment accurately to set the valve under varying conditions of gas supply within certain reasonable limits.

Other purposes or objects of the invention are to provide a gaseous fuel mixing valve comprising a minimum number of parts with the moving part located within the valve body where it is protected from dirt or other substances which might tend to cause it to stick, and to provide means for lubricating the valve effectively to insure its smooth operation.

The foregoing and other purposes or objects of the invention are attained in the valve construction illustrated in the accompanying drawings and described below. It is to be understood that the invention is not limited to the specific form thereof shown and described.

Of the accompanying drawings—

Figure 1 is a front elevation of a gaseous fuel mixing valve embodying the invention;

Figure 2 is a section on line 2—2 of Figure 1;

Figure 3 is a section on line 3—3 of Figure 2; and

Figure 4 is a section on line 4—4 of Figure 2.

Referring to the drawings, the numeral 10 designates a suitable valve body having an air inlet at 11 and an outlet for the mixed gas and air at 12, the valve body as shown being flanged about the air inlet opening as at 11a and about the outlet as at 12a, whereby the valve may be connected in a line leading to a motor (not shown) by bolting said flanges to corresponding flanges on adjacent sections of said line.

The valve body 10 is formed with a cylindrical bore 13 extending transversely therethrough in which is journaled a rotary valve member 14 formed with a passage or slot 14a therethrough in which incoming air and gas is mixed and delivered to the outlet 12.

To supply gas to said passage or mixing chamber 14a, the valve body is formed with an enclosed chamber 15 about one end of the bore 13 which is provided with a gas supply inlet 16 (Figure 4) to which a gas supply line (not shown) may be connected, said chamber having an inner peripheral outlet slot at 17 communicating with bore 13 and adapted to deliver gas to the passage 14a in the valve member 14. Passage 14a is provided with an off-set portion 14b for registering with said slot, the side of passage 14a at said off-set portion being defined by a vertical wall 14c and an inwardly inclined wall 14d, the wall 14d being designed to deflect the stream of entering gas into the stream of entering air whereby the two are mixed in the passage 14a.

The valve body is formed with a cylindrical groove 18 in the bore at the inlet which defines an arcuate inlet of uniform width having edges 19, 19 and 20, 20, whereby one edge of the passage 14a in the valve member such as the edge 21 will, in cooperation with the edges 19 and 20 at the inlet, define an adjustable air inlet in the valve. The edge 21 of the valve passage 14a also defines the adjustable edge of the gas inlet by cooperation with slot 17. The dotted line position of the valve member in Figure 3 would be about that required for a slow engine speed somewhat greater than an idling engine speed while the full line position of the valve member would be maximum engine speed, the valve being wide open.

The slot 17 constituting the inlet for the gas to passage 14a arcuately is of the same extent as the groove 18 (compare Figures 3 and 4) and it is of uniform width, but its normal width is substantially less than that of groove 18 (see Figure 2) and its effective width is adjustable to adapt the valve to operate under various conditions by varying the proportion of gas and air supply, the effective width of the slot 17 being determined by the position to which wall 14c of the valve member is adjusted.

In order to vary the position of the valve member for this purpose, an extension 14e thereon, which may carry a valve operating wheel 22, has a threaded socket 23 therein to receive a screw bolt 24 for drawing the valve member forwardly in the bore 13. The same screw bolt 24 may retain the wheel 22 upon the extension by engaging it through a retaining disc 25 which holds the wheel between it and the front end plate 26 of the valve body. The wheel is keyed to the extension as at 27 to permit this adjustment. The valve member 14 is normally urged rearwardly in the bore 13 by a spring 28 between the end plate 26 and the front end of the valve member about the extension 14e. In the position of adjustment of the valve member as shown in Figure 2 it will appear that the effective width of slot 17 is less than the normal width thereof by the amount which wall 14c of the passage in the valve member has been shifted forwardly (to the left in this view) from a position in alignment with the rear (right) edge of slot 17. The rear end of the bore 13 is covered by a rear end plate 29.

To adjust the valve for idling a motor, the end plate 26 may have an arm 30 thereon in which is threaded a screw 31, the end 31a of which is adapted to engage a spoke 32 on wheel 22. This limits shutting of the gas valve to a point at which the admission of gas and air through the valves is determined by narrow slits defined by the valve member with relation to the air and gas inlets at the bore 13.

It will be apparent that accuracy in proportions of air and gas depends upon the trueness of the edges of the air and gas inlet openings at the bore 13 and the trueness of the edge 21 of the passage 14a. These are finished to the highest degree of accuracy possible in the forming of metal parts. The edge 33 of the valve member passage 14a which cooperates with the outlet opening in the valve body need not be accurately finished but must be so formed as to provide a larger passage from the valve body than the combined areas of the gas and air inlet openings in all positions of adjustment of the valve so as not to restrict the flow of mixed air and gas through the outlet.

The valve is preferably constructed to be lubricated by the supply of lubricant to the spaces between the ends of the valve member and the end plates as by provision of vertical ducts 34 and 35 in the top of the valve body into which fittings 36, 36 may be threaded, these fittings being of any suitable type as, for example, that type provided with yieldingly closed hinged caps 36a.

The wheel 22 may be operated from a remote point by a line (not shown) attached thereto and it may be adapted to operate a standard gasoline carburetor associated with the internal combustion engine whereby either gas or gasoline may be used as fuel by pivotally connecting carburetor actuating mechanism including a rod 37 to the wheel as shown.

Due to the fact that the inlets to the valve at the bore are of uniform width and the same extent arcuately and that the degree of opening arcuately of both is determined by the edge 21 of the valve member 14, it will be apparent that the same proportion of air and gas will be furnished by the valve at all arcuate positions of the valve member, this proportion being determined by the relative widths of the air and gas inlet openings. By making the effective width of the gas inlet opening adjustable it is possible to adjust the valve for varying conditions of the gas supply to obtain the best proportions under any condition. When this adjustment is made, however, the same proportion of mixture is delivered by the valve at all speeds.

Modifications of the invention may be resorted to without departing from the spirit thereof or the scope of the appended claims.

What is claimed is:

1. In a gaseous fuel mixing valve, a housing having gas and air inlet ports and a gas and air mixture outlet port on the opposite side, said housing having a cylindrical bore extending transversely of said ports, a single valve member slidably and rotatably mounted in said bore and having a transverse opening communicating with all of said ports, means for moving said valve member longitudinally within said bore to vary the effective opening of said gas inlet port only, and means for moving said valve member angularly about its axis to a determinate fixed position to vary in direct proportion the effective openings of said gas and air inlet ports and the mixture outlet port.

2. In a gaseous fuel mixing valve, a housing having gas and air inlet ports and a gas and air mixture outlet port on the opposite side, said housing having a cylindrical bore extending transversely of said ports, a single valve member slidably and rotatably mounted in said bore and having a transverse opening communicating with all of said ports, one edge of said opening being adapted to vary the area of one of said inlet ports by movement of said valve member longitudinally while the area of the other inlet port remains substantially unchanged, means for moving said valve member longitudinally within said bore, and means for moving said valve member angularly about its axis to a determinate fixed position to vary in direct proportion the effective openings of said gas and air inlet ports and the mixture outlet port.

3. A gaseous fuel mixing valve for internal combustion engines, said valve having air and gas inlets and an outlet for delivering mixed gas and air therefrom, said valve being formed with a bore, a rotary valve member in the bore, said valve member having a passage therethrough in which the air and gas are mixed and adapted to cooperate with said inlets and said outlet, said inlets at said bore extending arcuately and each inlet being of uniform width, one edge of said passage at the end thereof that cooperates with said inlets being adapted to vary the effective arcuate extent of both of said inlets to obtain various volumes of air and gas in the same proportion, said rotary valve member being movable longitudinally of the bore whereby a wall of said passage may be adjusted relatively to the gas inlet at the bore to vary the effective width thereof, whereby the proportion of air and gas may be adjusted, means for adjusting said valve member including yielding means normally urging the valve member longitudinally of the bore in one direction and an adjusting screw for adjusting said valve member longitudinally of said bore in the other direction, an element for rotating the valve member, and adjustable means for limiting the rotation of the valve member toward closed position.

4. A gaseous fuel mixing valve for internal combustion engines, said valve having air and gas inlets and an outlet for delivering mixed gas and air therefrom, said valve being formed with a bore, a rotary valve member in the bore, said valve member having a passage therethrough in which the air and gas are mixed and adapted to cooperate with said inlets and said outlet, said inlets at said bore extending arcuately and each inlet being of uniform width, one edge of said passage at the end thereof that cooperates with said inlets being adapted to vary the effective arcuate extent of both of said inlets to obtain various volumes of air and gas in the same proportion, said rotary valve member being slidable longitudinally of the bore whereby a wall of said passage may be adjusted relatively to the gas inlet at the bore to vary the effective width thereof, whereby the proportion of air and gas may be adjusted, means for adjusting said valve member including yielding means normally urging the valve member longitudinally of the bore in one direction and an adjusting screw for adjusting said valve member longitudinally of said bore in the other direction, means for limiting movement of said valve toward a closed position for idling purposes, and an element operable at will for rotating the valve member to any desired position for obtaining speeds greater than idling.

5. A gaseous fuel mixing valve construction for supplying a combustible mixture of air and gas to a motor, said construction including a valve body having a bore therein, and having air and gas inlets to said bore and an outlet for mixed air and gas from said bore, said air and gas inlets extending arcuately of the valve body and being of uniform width, a rotary valve member in the bore, said valve member having a passage therethrough, a longitudinal edge of which is adapted in cooperation with the arcuate inlets to define inlets of various extents, said edge cooperating with both inlets to deliver air and gas in the same proportion to said passage in all positions of said edge when said valve member is rotated to vary the position of said edge respecting the inlets, said valve member being longitudinally adjustable in said bore to vary the effective position of said passage respecting one of said inlets to vary the effective width of said inlet, whereby the proportion of the air and gas may be adjusted.

6. A gaseous fuel mixing valve for internal combustion engines, said valve having air and gas inlets and an outlet for delivering mixed gas and air therefrom, said valve being formed with a bore, a rotary valve member in the bore, said valve member having a passage therethrough in which the air and gas are mixed and adapted to cooperate with said inlets and said outlet, said inlets at said bore extending arcuately and each inlet being of uniform width, one edge of said passage at the end thereof that cooperates with said inlets being adapted to vary the effective arcuate extent of both of said inlets to obtain various volumes of air and gas in the same proportion, said rotary valve member being slidable longitudinally of the bore whereby a wall of said passage may be adjusted relatively to the gas inlet at the bore to vary the effective width thereof, whereby the proportion of air and gas may be adjusted, means for adjusting said valve member including yielding means normally urging the valve member longitudinally of the bore in one direction and an adjusting screw for adjusting said valve member longitudinally of said bore in the other direction, and means operable at will for setting said valve in a determinate angular position respecting said inlets.

7. A gaseous fuel mixing valve for internal combustion engines, said valve having air and gas inlets and an outlet for delivering mixed gas and air therefrom, said valve being formed with a bore, and a rotary valve member in the bore, said valve member having a passage therethrough in which the air and gas are mixed and adapted to cooperate with said inlets and said outlet, said inlets at said bore extending arcuately and each inlet being of uniform width, one edge of said passage at the end thereof that cooperates with said inlets being adapted to vary the effective arcuate extent of both of said inlets to obtain various volumes of air and gas in the same proportion, said rotary valve member being movable longitudinally of the bore whereby a wall of said passage may be adjusted relatively to the gas inlet at the bore to vary the effective width thereof, whereby the proportion of air and gas may be adjusted, means operable at will for rotating said valve to a set angular position respecting said inlets to obtain a determinate motor speed, and adjustable means for limiting the rotation of the valve member toward closed position to set the valve in a motor idling position.

8. A gaseous fuel mixing valve for internal combustion engines, said valve having air and gas inlets and an outlet for delivering mixed gas and air therefrom, said valve being formed with a bore, and a valve member angularly adjustable and axially movable in the bore, said valve member having a passage therethrough in which the air and gas are mixed and adapted to cooperate with said inlets and said outlet, said inlets at said bore extending arcuately and each inlet being of uniform width, one edge of said passage at the end thereof that cooperates with said inlets being adapted to vary the effective arcuate extent of both of said inlets to obtain various volumes of air and gas in the same proportion, said valve member being adjustable axially of the bore whereby a wall of said passage may be adjusted relatively to the gas inlet at the bore to vary the effective width thereof, whereby the proportion of air and gas may be adjusted, and means operable at will for setting the valve in a desired angular position respecting said inlets to obtain a determinate motor speed.

9. A gaseous fuel mixing valve construction for delivering a combustible mixture of air and gas to a motor, said valve construction including a valve body having air and gas inlets and an outlet for the mixed air and gas, a single valve member movable angularly in said valve body respecting both of said inlets and said outlet to admit the required volumes of air and gas at the inlets and to deliver the mixture thereof to the outlet, said inlets and said valve member being so formed that the ratio of the effective areas of the inlets to each other will be constant at all positions of the valve member in such movement, said valve member being axially adjustable respecting the inlets to adjust the relative areas of said inlets to vary said ratio, and means operable at will for adjusting the valve in a determinate angular position respecting said inlets.

JOHN RIISE.